(12) United States Patent
Leitko et al.

(10) Patent No.: US 7,434,472 B2
(45) Date of Patent: Oct. 14, 2008

(54) DIFFERENTIAL PRESSURE TRANSDUCER CONFIGURATIONS INCLUDING DISPLACEMENT SENSOR

(76) Inventors: Travis W. Leitko, 11427 Slash Pine Pl., The Woodlands, TX (US) 77380; Richard L. Lopushansky, 131 W. Shadowpoint Cir., The Woodlands, TX (US) 77381; Larry A. Jeffers, 16531 Lisbon St., Minerva, OH (US) 44657; John W. Berthold, 1370 N. Union Ave., Salem, OH (US) 44460

( * ) Notice: Subject to any disclaimer, the term of this patent is extended or adjusted under 35 U.S.C. 154(b) by 41 days.

(21) Appl. No.: 11/709,669

(22) Filed: Feb. 22, 2007

(65) Prior Publication Data

US 2007/0227252 A1  Oct. 4, 2007

Related U.S. Application Data

(60) Provisional application No. 60/788,398, filed on Mar. 31, 2006.

(51) Int. Cl.
*G01L 13/02* (2006.01)
(52) U.S. Cl. .............................. 73/716; 73/706; 73/715; 73/753; 361/283.4
(58) Field of Classification Search ........... 73/700–756; 361/283.1–283.4
See application file for complete search history.

(56) References Cited

U.S. PATENT DOCUMENTS

| | | | |
|---|---|---|---|
| 4,393,714 A | * | 7/1983 | Schmidt ..................... 73/718 |
| 4,668,889 A | | 5/1987 | Adams |
| 5,319,981 A | | 6/1994 | Mei et al. |
| 5,796,007 A | * | 8/1998 | Panagotopulos et al. ...... 73/716 |
| 6,328,647 B1 | | 12/2001 | Traudt |
| 6,422,084 B1 | | 7/2002 | Fernald et al. |
| 6,439,055 B1 | | 8/2002 | Maron et al. |
| 6,668,656 B2 | | 12/2003 | Fernald et al. |
| 6,820,489 B2 | | 11/2004 | Fernald et al. |
| 6,955,085 B2 | | 10/2005 | Jones et al. |
| 7,047,816 B2 | | 5/2006 | Jones et al. |
| 2005/0241399 A1 | | 11/2005 | Lopushansky et al. |

* cited by examiner

*Primary Examiner*—Andre J. Allen
*Assistant Examiner*—Jermaine Jenkins
(74) *Attorney, Agent, or Firm*—McDonald Hopkins LLC; Risto Pribisich; Robert H. Earp, III

(57) ABSTRACT

The present invention pertains to differential pressure transducers. In an embodiment of the invention, a differential pressure transducer includes a transducer housing, a diaphragm, a bellows, and a sensing assembly. The transducer housing, diaphragm, and bellows are coupled to form a pressure chamber. The pressure chamber is separated into two portions by the diaphragm, with each portion arranged to be filled with a process fluid. A pressure differential across the diaphragm causes displacement of the diaphragm. Such displacement is measured by the sensing assembly and used to calculate the pressure differential between the two process fluids.

19 Claims, 6 Drawing Sheets

DIFFERENTIAL PRESSURE TRANSDUCER CONFIGURATIONS INCLUDING DISPLACEMENT SENSOR

CROSS-REFERENCE TO RELATED APPLICATION

This application claims priority from U.S. Provisional Patent Application No. 60/788,398 filed on Mar. 31, 2006, which is hereby incorporated in its entirety by reference.

FIELD OF THE INVENTION

The present invention relates in general to differential pressure transducers, and more particularly to a differential pressure transducer configuration that includes a displacement sensor.

BACKGROUND OF THE INVENTION

Generally, differential pressure transducers contain a displacement sensor coupled between two thin diaphragms. The two diaphragm arrangement performs a mechanical subtraction of pressures applied to the diaphragms. The sensor measures the net motion of the diaphragms relative to the transducer body to determine the differential pressure. In order to prevent diaphragm rupture while maintaining the desired sensitivity to differential pressure, the volume between the diaphragms, which includes the sensor, is filled with a hydraulic fill fluid. When process line pressure is presented to one side of each diaphragm, the fill fluid is pressurized to the line pressure. If the boundary of the volume between the diaphragms, including the diaphragms themselves, the electrical feed-throughs, and fill/bleed ports, are each not properly sealed, small leaks of fill fluid will occur. This will cause unacceptable increases in response time, sensor output drift, and transducer non-linearity with pressure. In some cases, these changes may not be readily detected when the transducer is in service because the transducer output may remain stable at constant differential pressures. The leaking of fill fluid from these known differential pressure transducers is a problem that is well known and documented.

Another deficiency in fluid-filled differential pressure transducers is a static pressure effect. A differential pressure transducer as described should output a value of zero when the same process pressure is applied to both diaphragms. However, the static pressure causes the fill fluid to be pressurized, which resulting in distortions in the transducer body. These distortions cause relative motion between the diaphragms and transducer body resulting in a static pressure effect. This effect causes values other than zero when both diaphragms experience equal process pressures. The distortions also produce radial forces on the diaphragms, which change the effective stiffness of the diaphragm and causes static pressure effects on span. In addition, the displacement sensor is exposed to the fill-fluid pressure environment adding to the static pressure effects on both zero and span. In applications involving static pressures of several thousand pounds per square inch (psi) or greater, the requirement for a stable zero and span over the allowable range of static pressure is difficult to achieve in practice.

Yet another deficiency in fluid-filled differential pressure transducers is the effect of hydrogen. When differential pressure transducers are operated in a hydrogen-rich environment, for example, in a hydrocarbon processing facility, the hydrogen gas easily diffuses through the diaphragms and into the fill fluid. For example, if the differential pressure transducer is used to measure pressure differences in a hydrogen-rich high-pressure pipeline, the fill fluid will experience the large static pipeline pressure and hydrogen will diffuse through the diaphragms into the fill fluid. When the pipeline pressure is reduced, such as during scheduled shutdowns, hydrogen gas boils out of the fill fluid and forms bubbles. Since the enclosed volume of fill fluid is constant, bubbles of hydrogen within the closed volume deform the diaphragms, resulting in a calibration shift, zero offset, or in the worst case, diaphragm rupture.

The use of a fill fluid also contributes to degraded performance of differential pressure transducers when operated over a range of temperatures, as is normal in service. The volumetric expansion of liquids with changes in temperature is significantly greater than that of the metals used in construction of the transducer body. Thus, when the environmental temperature of either the differential pressure transducer or process fluids changes, the volume of the fill fluid in the transducer and capillary lines changes. Unless the changes in fill-fluid volume are perfectly balanced on both the high and low-pressure sides of the transducer, the result is significant errors in the output of the transducer. The normal method for limiting this effect is to keep the volume of the fill fluid at an absolute minimum. However, in addition to only limiting the problem and not eliminating it, this method aggravates the effect of fill fluid leakage because any loss of fluid is a more significant part of the total fluid volume.

Rather than perform a mechanical subtraction of two large pressures as described above, an alternative approach is to measure each pressure with separate gage pressure transducers and perform an electronic subtraction to calculate the differential pressure. If the full-scale differential pressure range to be measured is 400 inch $H_2O$ (15 psi) and the desired accuracy is 0.1% of the full scale range (i.e., 0.015 psi), then for applications at 3000 pounds per square inch gauge (psig) line pressure, a gage pressure transducer is required that has an accuracy of 0.015/3000=0.0005% (1:200,000). Such devices are not commercially available. Thus, electronic subtraction is not practical and mechanical subtraction of two large pressures is the only practical alternative measurement approach available with present day technology.

Presently, there is no known system or method for providing a differential pressure transducer that avoids the problems associated with the known devices listed above. The present invention as described and claimed herein, addresses the deficiencies of prior art differential pressure transducers

SUMMARY OF THE INVENTION

The present invention pertains to differential pressure transducers. In an embodiment of the invention, a differential pressure transducer includes a transducer housing, a diaphragm, a bellows, and a sensing assembly. The transducer housing, diaphragm, and bellows are coupled to form a pressure chamber. The pressure chamber is separated into two portions by the diaphragm, with each portion arranged to be filled with a process fluid. A pressure differential across the diaphragm causes displacement of the diaphragm. Such displacement is measured by the sensing assembly and used to calculate the pressure differential between the two process fluids.

In another embodiment of the present invention, the sensing assembly includes a Fabry-Perot fiber optic displacement sensor to measure displacement of the diaphragm.

In yet another embodiment of the present invention, the differential pressure transducer includes a stem coupled to the center of the diaphragm. The stem moves through the same displacement as the center of the diaphragm along an axis passing through the center of the diaphragm. The sensor assembly is positioned to measure movement of the stem.

DESCRIPTION OF THE DRAWINGS

Operation of the invention may be better understood by reference to the following detailed description taken in connection with the following illustrations, wherein.

DETAILED DESCRIPTION

While the present invention is described with reference to embodiments described herein, it should be clear that the present invention is not limited to such embodiments. Therefore, the description of the embodiments herein is merely illustrative of the present invention and will not limit the scope of the invention as claimed.

Figure 1:
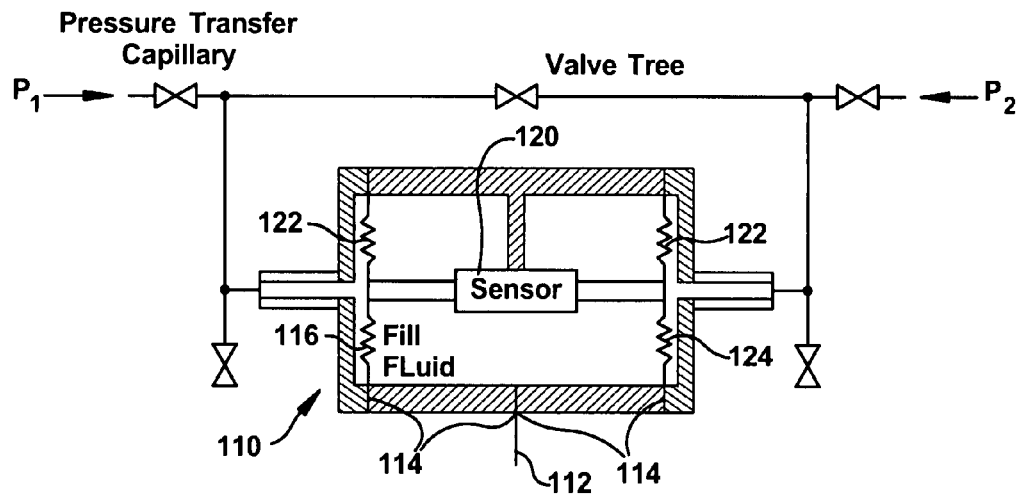
FIG. 1 is a schematic view illustrating a first known differential pressure transducer.

FIG. 1 illustrates a first known differential pressure transducer having a differential pressure cell 110 comprising two spaced diaphragms 122 connected to a housing by seals 114. Fill fluid 116 and a sensor 120 are contained between the diaphragms 122 as well as a sensor lead wire 112. Diaphragm stops 124 are employed outside of the diaphragms 122.

Figure 2:
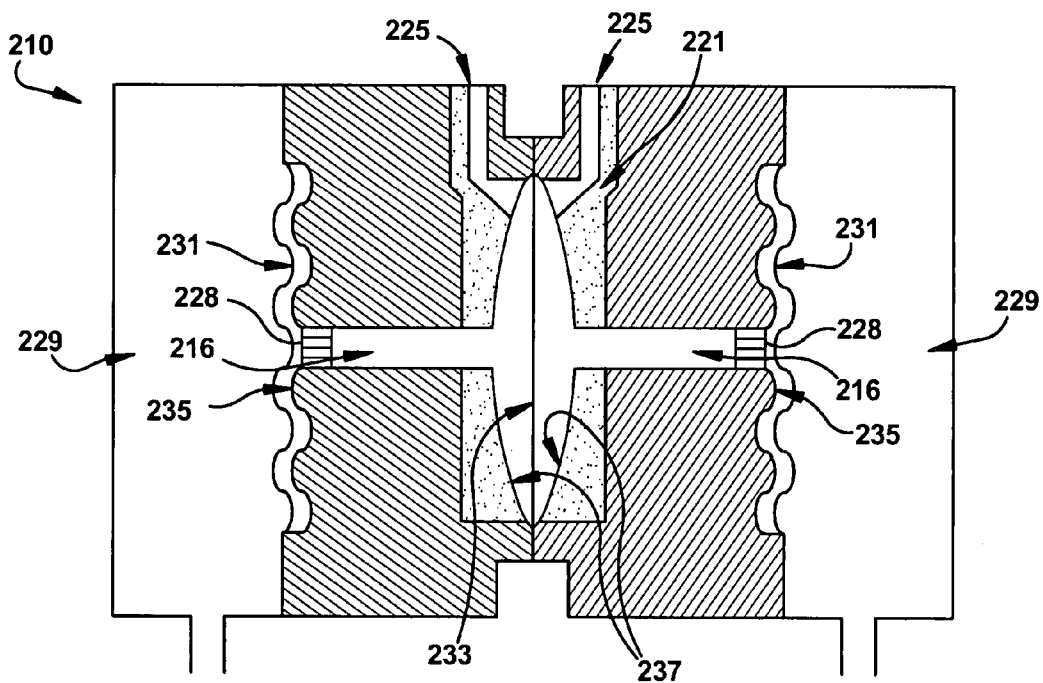
FIG. 2 is a schematic view illustrating a second known differential pressure transducer.

FIG. 2 illustrates a second known transducer, which is also a fluid-filled differential pressure transducer. The welded assembly 210 comprises isolation diaphragms 231, a sensing diaphragm 233, fill fluid 216, lead wires, and high-pressure and low-pressure fill tubes 225. The measured change in capacitance between the sensing diaphragm 233 and high and low pressure metallized surfaces 237 is directly proportional to the pressure difference across the transducer 210. The cell further comprises process chambers 229 spaced away from convoluted pressure plates 235. An electrical insulator 221 is also provided as well as ceramic inserts 228.

The fill tube penetrations 225 are the locations most likely to leak fill fluid over time. For example, in a process plant pipeline application the pressure on the fill fluid 216 is nominally 3000 psi at operating pressure. If the fill tube diameters 225 are kept small, the force acting on the fluid 216 to push it out of the fill tube penetrations 225 will also be small. Nevertheless, a good seal is difficult to maintain. Fill fluid leaks are also possible between the outside diameter of the fill tube 225 and the glass insulating material 221 and along the boundaries between the insulating material 221 and metal housing 211. Thus, it is very difficult to make a totally leak-tight seal, since penetrations through the high-pressure boundary must be made.

One approach to solving some of the deficiencies of the prior art is to place a rigid piston between a pair of diaphragms. Such an arrangement eliminates the need for fill fluid. A differential pressure transducer arranged with a rigid piston is described in U.S. patent application Ser. No. 11/105,670, filed on Apr. 14, 2005, and titled "DIFFERENTIAL PRESSURE TRANSDUCER WITH FABRY-PEROT FIBER OPTIC DISPLACEMENT SENSOR," which is hereby incorporated in its entirety by reference.

The present invention provides an alternative to the use of the fill-fluid differential pressure transducers presented in FIGS. 1 and 2. The present invention utilizes a single diaphragm, which is used to separate a pressure chamber in a transducer housing into two portions. The first portion of the pressure chamber is filled with a first process fluid that exposes a first side of the diaphragm to a first pressure. The second portion of the pressure chamber is filled with a second process fluid that exposes a second side of the diaphragm to a second pressure. When the first and second pressures are unequal, the diaphragm deflects or moves toward the lower pressure process fluid. A sensing assembly positioned to observe the diaphragm detects such movement. The differential pressure across the diaphragm is calculated based on the magnitude of movement of the diaphragm.

In an embodiment, the first and second portions of the pressure chamber are each sealed by a bellows, which is coupled to the transducer housing and the diaphragm. The bellows seals the pressure chamber such that process fluid does not interact with either the sensing assembly or the portion of the diaphragm observed by the sensing assembly. Such an arrangement allows the sensing assembly to be positioned such that it is only exposed to ambient pressures and eliminates the need for a sensor to detect movement through a fill fluid or process fluid.

The sensing assembly may optionally include an optical sensor, such as a Fabry-Perot fiber optic displacement sensor, to detect and measure movement of the diaphragm. Although the present invention as described incorporates an optical sensor, specifically a Fabry-Perot fiber optic sensor, it will be readily understood by those skilled in the art that any sensor, whether optical, mechanical, electrical, or the like, may be used with the present invention, provided it is capable of measuring displacement of a diaphragm.

A stem may optionally be coupled to the diaphragm, along a central axis passing through the diaphragm. The stem is arranged such that deflection of the diaphragm moves the stem proportionally to the diaphragm displacement and linearly along the axis passing through the diaphragm. The stem may extend towards the Fabry-Perot sensor and include a reflective surface to optically interact with the sensor to detect movement of the stem.

In an embodiment, mechanical stops may be used to limit movement of the diaphragm. The diaphragm may be exposed to high pressures such as, for example, 3000 psi. The inclusion of stops may prevent the diaphragm from deforming excessively or rupturing when exposed to such high pressures. In addition, in order to extend the service life and improve high-pressure tolerance, the diaphragm may be fabricated from a high strength alloy such as, for example, Inconel alloy 718.

Figure 3A:
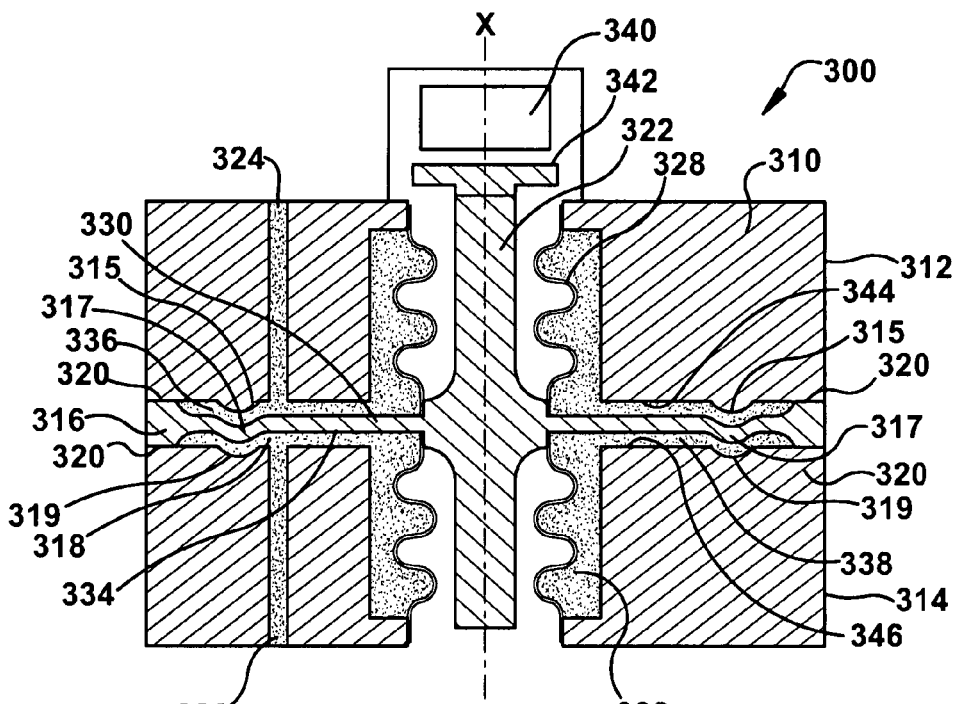
FIG. 3A is a schematic view of an exemplary embodiment of a differential pressure transducer in accordance with the present invention.

An exemplary embodiment of a differential pressure transducer 300 is schematically illustrated in FIG. 3A. The transducer 300 includes a transducer housing 310 comprising a pair of flanges 312, 314. The flanges 312, 314 are generally cylindrical in shape and may be fabricated from steel or other such rigid material. A diaphragm 316 is coupled to the housing 310 and positioned in a pressure chamber 318 defined by the housing 310. The diaphragm 316 is coupled to the housing 310 by a weld along the periphery 320 of the diaphragm 316. The diaphragm 316 also includes an annular convolution 317 which can nest during certain pressure conditions with the protuberance 315 or indentation 319 of the flanges 312, 314 respectively. The purpose of these features is to enable the convolution to nest without deformation or damage if there is an overpressure on one side of the diaphragm 316 or the other. Although the diaphragm 316 is described as coupled to the housing 310 by a weld, it will be understood by those skilled in the art that any means of securing the diaphragm 316 to the housing 310 is incorporated into the present disclosure. A stem 322 is coupled to the diaphragm 316, preferably along a central axis X passing through the diaphragm 316. As used herein, the term coupled includes any known method of securing one component to another. For example, the stem 322 may be integrally incorporated into the diaphragm 316 or the stem 322 may be secured to the diaphragm 316 by a mechanical means, such as welding, bonding, adhering, fastening, or the like.

The housing 310 includes a pair of inlets 324, 326 to channel process fluids into the pressure chamber 318. An upper bellows 328 is coupled to the housing 310 and an upper surface 330 of diaphragm 316. A lower bellows 332 is coupled to the housing 310 and a lower surface 334 of the diaphragm 316. The bellows 328, 330 are coupled to the housing 310 and diaphragm 316 by welds; however, any means of securing the bellows 328, 332 to the housing 310 and diaphragm 316 is incorporated into the present disclosure.

As seen in FIG. 3A, the upper bellows 328, the upper surface 330 of the diaphragm 316, and the housing 310 form the boundaries of a sealed upper cavity 336 that is in fluid communication with the upper inlet 324. The upper inlet is 324 is used to channel process fluid into the upper cavity 336 and expose the upper surface 330 of the diaphragm 316 to the pressure of the process fluid. The lower bellows 332, the lower surface 334 of the diaphragm 316, and the housing 310 form the boundaries of a sealed lower cavity 338 that is in fluid communication with the lower inlet 326. The lower inlet is 326 is used to channel process fluid into the lower cavity 338 and expose the lower surface 334 of the diaphragm 316 to the pressure of the process fluid. In essence, the diaphragm 316 is positioned to separate the pressure chamber 318 into the upper and lower cavities 336, 338.

Exposing the upper and lower surfaces 330, 334 of the diaphragm 316 to process fluids with different pressures will deflect or move the diaphragm 316 in the direction of the process fluid with the lower pressure. Due to the coupling of the stem 322 to the diaphragm 316, any movement or deflection of the diaphragm 316 will be transferred to the stem 322. For example, if the pressure of the process fluid in the upper cavity 336 is lower than the pressure of the process fluid in the lower cavity 338, the diaphragm 316 will deflect towards the upper cavity 336. The stem 332 will react by moving upward, with respect to FIG. 3A. Conversely, if the pressure of the process fluid in the lower cavity 338 is lower than the pressure of the process fluid in the upper cavity 336, the diaphragm 316 will deflect towards the lower cavity 338. The stem 332 will react by moving downward, with respect to FIG. 3A.

A sensor assembly 340 is positioned above the stem 322 to detect movement of the stem 322. When the diaphragm 316 deflects upward, resulting in the stem 322 moving upward, the sensor assembly 340 detects the upward movement of the stem 322. This upward movement is an indication that the process fluid filling the upper cavity 336 has a lower pressure than the process fluid filling the lower cavity 338. The magnitude of the movement of the stem 322 is used to calculate the difference in pressure between the two process fluids. In one embodiment, the sensor assembly 340 includes a Fabry-Perot sensor, which will be described in detail below. In such an arrangement, the stem 322 includes a flat surface 342 that may be reflective or include a reflector, which is utilized by the Fabry-Perot sensor to detect movement of the stem 322.

The bellows 328, 332 are arranged to seal the upper and lower cavities 336, 338 and prevent leaks of process fluids from the cavities 336, 338. This arrangement seals the sensing assembly 340 and the portion of the diaphragm 316 observed by the sensor assembly 340 from process fluids. In the embodiment described herein, the stem 322 is the portion of the diaphragm 316 observed and measured by the sensor 340. The sensor 340 and stem 322 are exposed only to ambient pressure, which eliminates problems presented by prior art differential pressure transducers.

Under conditions of large pressure differences between process fluids, the diaphragm 316 may deflect substantially. To prevent fracture or rupture of the diaphragm 316, the housing 310 includes diaphragm stops to limit deflection of the diaphragm 316. As illustrated in FIG. 3A, the housing 310 may include an upper bearing surface 344 positioned above the upper surface 330 of the diaphragm 316 to limit upward movement of the diaphragm 316, with respect to FIG. 3A. In addition, the housing 310 may include a lower bearing surface 346 positioned below the lower surface 334 of the diaphragm 316 to limit downward movement of the diaphragm 316, with respect to FIG. 3A. Such bearing surfaces 344, 346 may be arranged such that the deformation of the material of the diaphragm 316 is within the elastic range of the material, e.g., the deformation is reversed when forces on the diaphragm 316 are removed.

In an embodiment, the bearing surfaces 344, 346 are arranged such as to allow for maximum deflection of the diaphragm 316 without allowing the diaphragm 316 to undergo plastic deformation or other such permanent damage. Such an arrangement allows for the highest pressure differential between two processing fluids without the diaphragm 316 undergoing permanent damage.

The bellows 328, 332 as shown in FIG. 3A include a number of corrugations. Such corrugations improve flexibility and lessen the restriction on movement of the diaphragm 316 without jeopardizing the quality of the seal. The corrugations improve high sensitivity measurements of differential pressure across the diaphragm 316. Any number of corrugations may be practiced with this invention. For example, the bellows 328, 330 may include three corrugations. In an embodiment, the bellows 328, 332 may be fabricated from Inconel 718 alloy or similar high strength material.

As described herein, the differential pressure transducer includes a diaphragm and two bellows used to seal a pressure chamber. It will be readily appreciated by those skilled in the art that the present invention may be practiced with a single bellows. For example, the diaphragm and bellows may be integrally fabricated. Such an integrated diaphragm and bellows may be fabricated from Inconel 718, or other such high strength materials.

The use of a single diaphragm eliminates the need for fill fluid and avoids many of the disadvantages of prior art differential pressure transducers. The arrangement of the bellows 328, 332 to seal the process fluid from the stem 322 and sensor assembly 340, as shown in FIG. 3A, eliminates the need for lead wires to penetrate into any pressurized fluid filled chambers and allows the sensor assembly 340 to be positioned at ambient pressure and not in a high pressure chamber. This arrangement protects the sensor assembly 340 and eliminates the difficulty of optically detecting movement through process or fill fluids. In addition, neither hydrogen-rich process fluids nor high temperature ranges cause the problems experienced with prior art differential pressure transducers.

Figure 4:
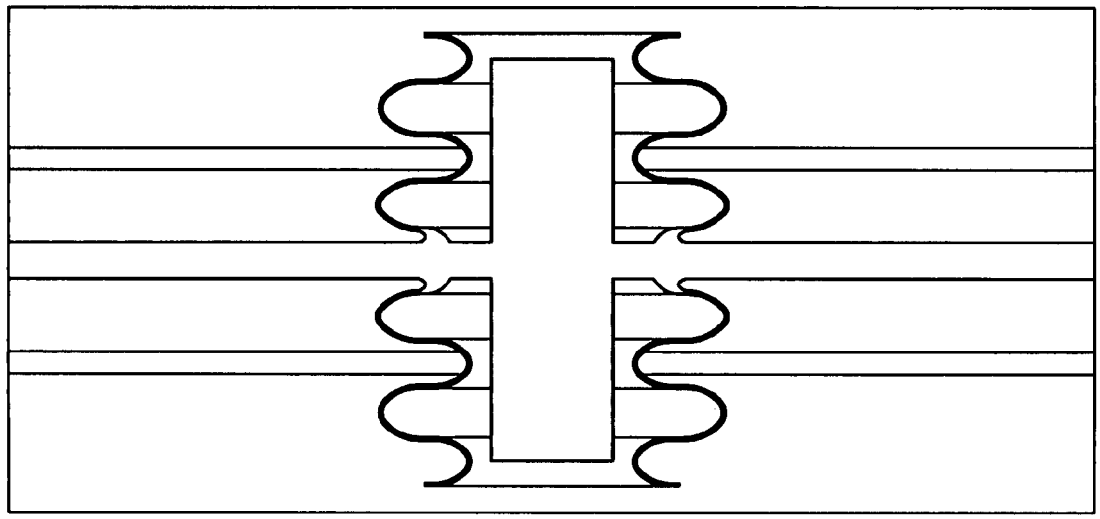
FIG. 4 is a model based on the present invention used for finite element stress analysis.

The use of the embodiment illustrated in FIG. 3A produces consistent, predictable displacement of the stem 322 over the expected range of static pressures and temperatures. The results of finite element stress analysis modeling of the design are summarized in Table 1, where the differential pressure is 15 psi. The basic model configuration for the analysis is shown in FIG. 4.

| Static Pressure (psi) | Displacement of stem (μm) |
| --- | --- |
| 3000 | 3.43 |
| 2500 | 3.43 |
| 2000 | 3.44 |
| 1500 | 3.44 |
| 1000 | 3.44 |
| 500 | 3.45 |
| 0 | 3.45 |
| Error over Full Range of Static Pressure (0 to 3000 psi) | 0.58% |

In an embodiment, the multiple corrugation bellows transducer design illustrated in FIG. 3A meets the following specifications: survive 3000 psi static pressure without bursting; equal (same) deflection at 15 psi differential for all static pressures up to 3000 psi static; 3.0 inch outside diameter of diaphragm; high strength diaphragm material; less than 100 ksi stress to bellows; and tolerant of 1000° F.

Figure 3B:
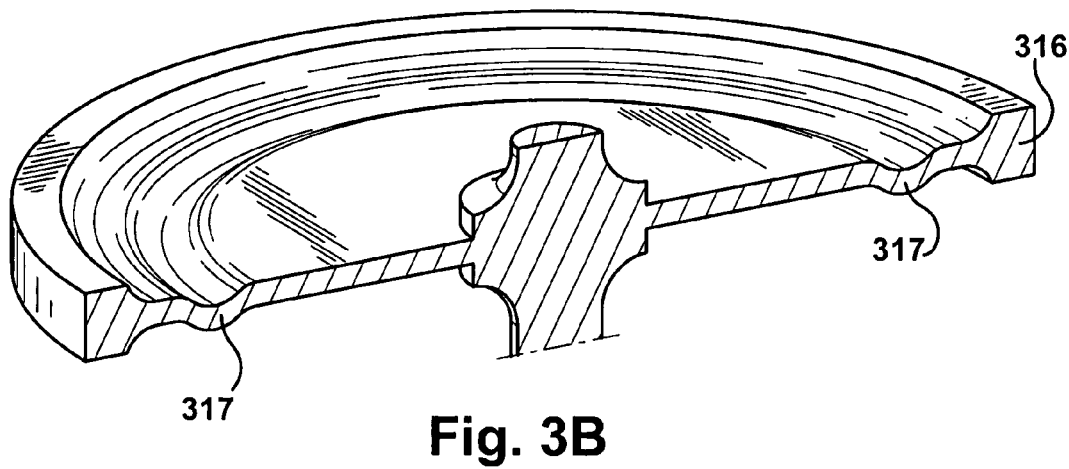
FIG. 3B is a schematic of the diaphragm shown in FIG. 3A.
Figure 3C:
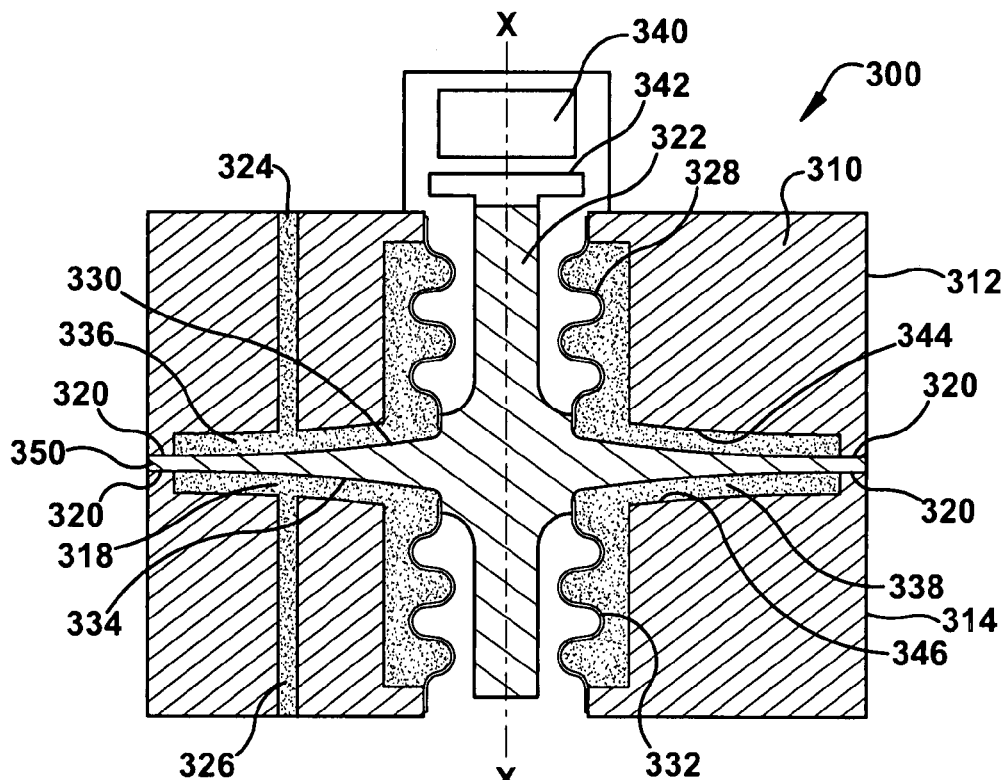
FIG. 3C is a schematic view of another exemplary embodiment of a differential pressure transducer in accordance with the present invention.
Figure 3D:
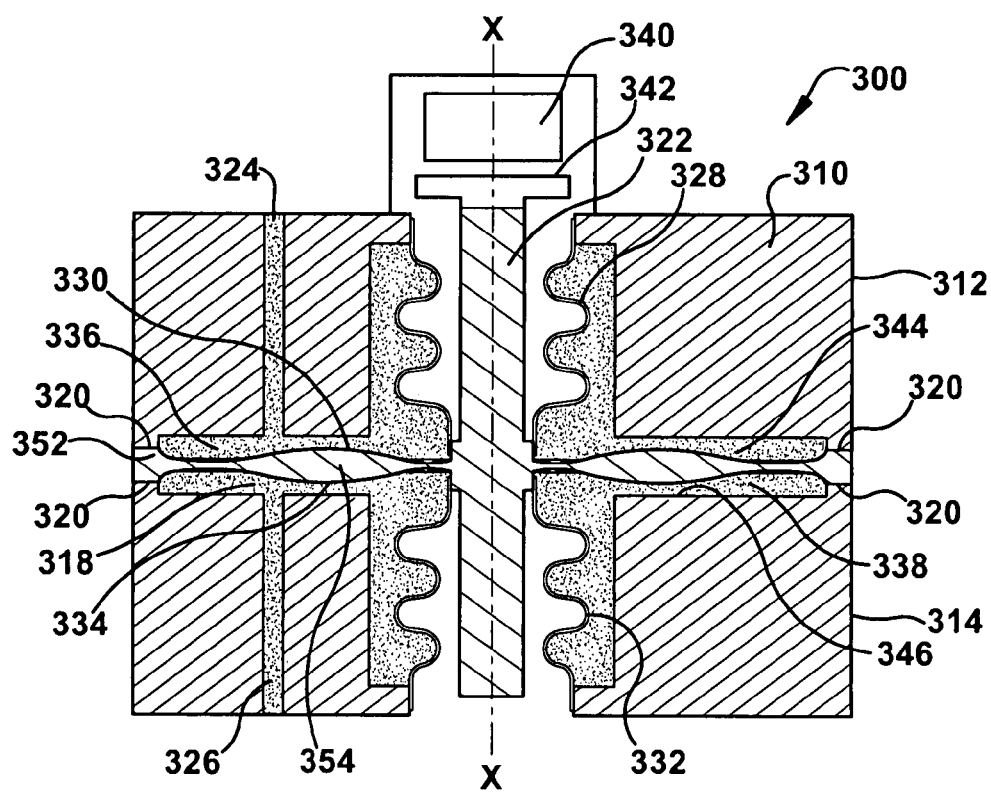
FIG. 3D is a schematic view of yet another exemplary embodiment of a differential pressure transducer in accordance with the present invention.

The diaphragm 316 illustrated in FIG. 3A has a generally consistent thickness (defining thickness as the distance from the upper surface 330 of the diaphragm 316 to the lower surface 334 of the diaphragm 316) throughout the cross-section of the diaphragm 316. The circular diaphragm has a single convolution 317 near the outer edge as shown. However, it will be readily understood by those skilled in the art that any shape or configuration of diaphragm may be utilized with a transducer 300. FIG. 3B shows the diaphragm from FIG. 3A in more detail. FIGS. 3C and 3D illustrate exemplary alternative diaphragm designs. Components and features illustrated in FIGS. 3C and 3D include many components and features that are identical or similar to components and features illustrated in FIG. 3A. Such identical or similar components and features are shown and in FIGS. 3C and 3D with the same reference numbers as in FIG. 3A.

FIG. 3C illustrates a diaphragm 350 that is tapered such that the thickness of the center of the diaphragm 350 is greater than the thickness of the periphery 320 of the diaphragm 350. Such an arrangement may provide for a diaphragm 350 that offers smaller deflection at a given pressure differential than a diaphragm 316 with a constant cross-sectional thickness. The tapered diaphragm 350 may be used when pressures differentials are anticipated to be relatively high. FIG. 3D illustrates another exemplary diaphragm 352. The diaphragm 352 includes a portion 354 that has a greater cross-sectional thickness than the remainder of the diaphragm 352. The thickened portion 354 may be arranged to give the diaphragm 354 greater stiffness, greater flexibility, greater sensitivity to pressure differentials, or the like.

Figure 5:
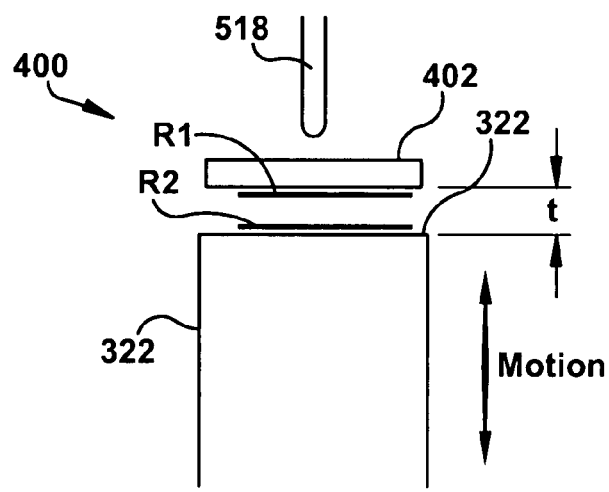
FIG. 5 is an expanded schematic view of a fiber optic sensor subassembly used in conjunction with the present invention.

FIG. 5 illustrates an exemplary Fabry-Perot fiber optic sensor subassembly 400 for use in measuring motion translated to the stem 322 from a diaphragm deflecting due to differential pressure. The sensor 400 consists of two closely spaced reflectors R1 and R2. The first reflector R1 may be secured to a borosilicate window 402 and the second reflector R2 may be secured to the surface 342 of the stem 322. In an embodiment, such reflectors R1 and R2 may be separate components secured, respectively, to the borosilicate window 402 and the surface 342 of the stem 422. In an alternative embodiment, the reflectors R1 and R2 may be a dielectric coating with approximately 35% reflectance deposited, respectively, on a borosilicate window 402 and the surface 342 of the stem 322. As differential pressure causes the stem 322 to move along the axis X, the spacing changes between the first reflector R1 and the second reflector R2. In an embodiment, the gap between reflectors R1 and R2 is adjusted to be approximately 15 μm during manufacturing. As summarized in Table 1, the range of the motion of the stem 322 may be ±3.45 μm. Thus the nominal displacement range between the reflectors R1 and R2 is 11.55 μm to 18.45 μm.

Figure 6A:
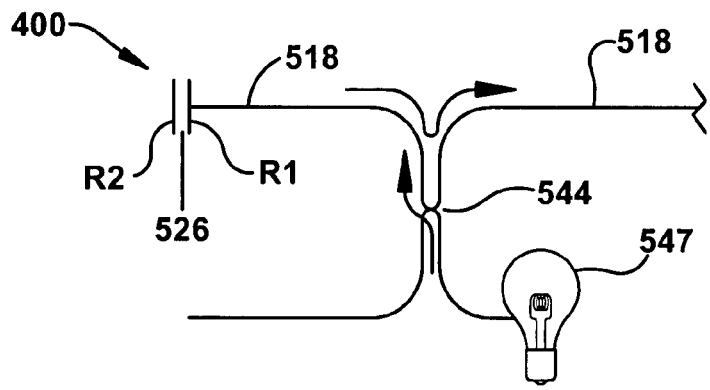
FIGS. 6A through 6C are schematic views of a sensing system with a light signal processor used in conjunction with the present invention.
Figures 6B, 6C:
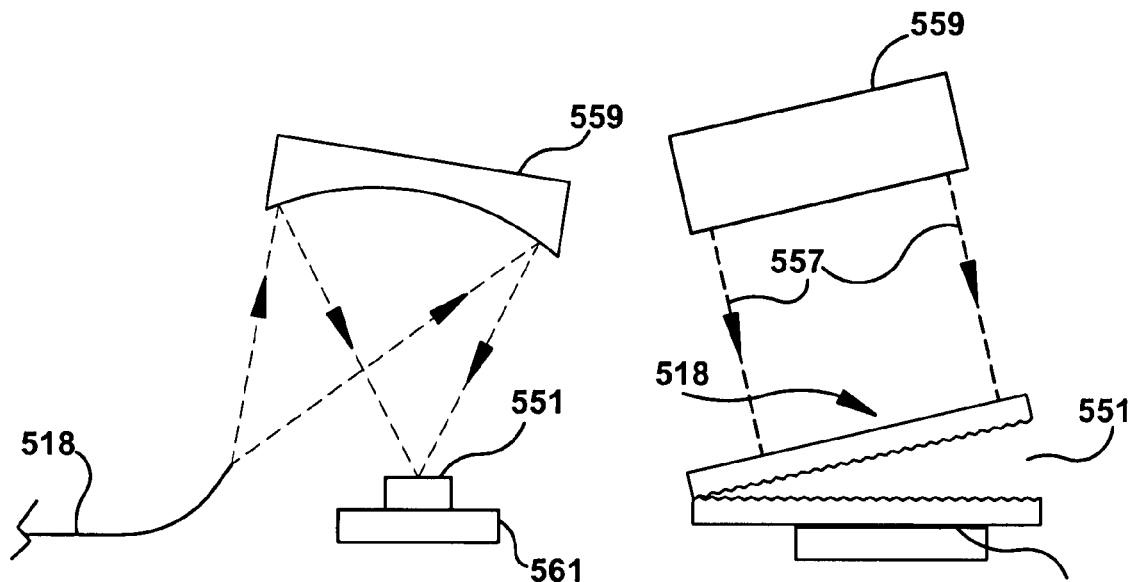

FIGS. 6A-6C are schematic views of a Fabry-Perot sensing system with a light signal processor used in conjunction with the sensor subassembly 400 shown in FIG. 5. Referring to FIG. 6A, the Fabry-Perot gap 526 is shown schematically along with the reflectors R1 and R2 and an optical fiber 518, which delivers light to the sensor subassembly 400 from a source 547 through an optical splitter (coupler) 544. Light reflected from the gap 526 reenters the fiber 518, returns to the coupler 544 and is delivered to a cylindrical mirror 559, as seen in FIGS. 6B and 6C. As can be seen in the figures, the mirror 559 does not focus light uniformly in all dimensions, i.e., a point is focused to a line. Light source 547 provides a multi-wavelength white light signal having predetermined spectral characteristics. The light is reflected from the gap 526 and through optical fiber 518, where the mirror 559 collects and focuses at least a portion of the light signal to a Fizeau wedge 551 through which the focused light signal is passed.

As described in reference to FIG. 5, the Fabry-Perot gap 526 includes two reflectors R1 and R2, which are substantially parallel to one another and spaced by a given distance so as to define a Fabry-Perot gap 526 that reflects light with spectral properties that are affected by changes in the gap thickness. The Fabry-Perot gap 526 is provided with a multimode optical fiber 518 coupled to both the light source and the cylindrical mirror 559 through the optical coupler 544. As earlier described, light reflected from the Fabry-Perot gap 526 passes through the Fizeau wedge 551. Exiting wedge 551 is a spatially spread light signal indicative of the spectral characteristics of the light reflected from the Fabry-Perot gap 526. Thereby, the thickness of gap 526 can be determined by measurement and analysis of the spectrum of the spatially spread light signal.

In operation, the luminous flux emitted by the light source 547 (for example a tungsten filament lamp) is launched into the optical fiber 518 and the light is guided to the coupler 549, which routes approximately 50% of the light to the Fabry-Perot gap 526. A portion of the light is reflected from the Fabry-Perot gap 526. By measuring the reflected light spectrum equal to 1−X(λ), the thickness, t of the Fabry-Perot gap 526 may be calculated by cross-correlating the measured spectrum X(λ) with the theoretical transmittance function given by:

$$T(\lambda,t)=(1+F\sin^2[2\pi nt/\lambda])^{-1} \quad (1)$$

where t is the spacing between reflectors R1 and R2, n is the refractive index of material between reflective surfaces R1 and R2 (e.g. for air n=1), λ is the wavelength of the light signal, and F=4R/(1−R), where R is the reflectance of the reflectors R1 and R2.

The cross-correlation function C(t) is then calculated as a function of the gap thickness t with the following relation:

$$C(t) = M^{-1}\sum_{n=0}^{M-1} X(\lambda_o + n\Delta\lambda)(1 + F\sin^2[2\Pi nt/(\lambda_o + \Pi\Delta\lambda)])^{-1} \quad (2)$$

where the effective gap thickness t is given by a maximal cross-correlation coefficient $C(t)_{max}$.

In general, measurement of the reflected light spectrum requires sophisticated apparatus and calculation of the cross-correlation function is very time consuming. To simplify these requirements an instantaneous method is used to obtain C(t) with an optical cross-correlator, which is the Fizeau wedge 551. The Fizeau wedge 551 consists of two surfaces that intersect at an angle of approximately 1.2 arc minutes. Both surfaces have a reflectance of approximately 30% and transmittance of approximately 70%.

The Fizeau wedge 551 works like a cross-correlator where the separation between reflectors depends on the position along the wedge. For example, the light intensity reflected from the Fabry-Perot gap 526 having a thickness of 8×10−4 inch will be maximally transmitted by the Fizeau wedge 551 at an exact position along the wedge 551 where the distance between the reflective surfaces is equal to 8×10−4 inch. When the thickness of the Fabry-Perot gap 526 in FIG. 6A changes with diaphragm deflection, the location of maximally transmitted light intensity will shift a corresponding amount to a new position along the Fizeau wedge 551. Therefore, the gap thickness 526 and thus the magnitude of diaphragm deflection can be determined from a measured shift in the maximally transmitted light intensity C(t)max.

The cross-correlation C(t) is instantaneously produced because the entire width of the Fizeau wedge 551 is illuminated by light projected from the cylindrical mirror 559, which images a point to a line. The point is the exit end of the optical fiber 518 from which the output light signal emanates and the line spans the region of the wedge 551 denoted by the spacing between the dotted lines 557 in the front view portion of FIG. 6C. The light signal transmitted through the Fizeau wedge 551 is then detected by a photodetector array 561, which can be a charge-coupled device (CCD) detector array or a photodiode array where both consist of a linear set of discrete light detectors called pixels. Detector array 561 receives the spatially spread light signal (from the Fizeau wedge 551) and generates a set of discrete electrical signals that represent the spectrum of the spatially spread light signal. Thus, the cross-correlation function C(t) is coded onto the pixels of the photodetector array 561 and each pixel corresponds to a unique correlated Fabry-Perot gap thickness 526. The gap thickness 526 may range for example from 0 to 25 μm (0 to 0.001 inch). The thickness of the Fabry-Perot gap 526 is finally determined by the position of the pixel that measures the maximum light intensity.

Figure 6D:
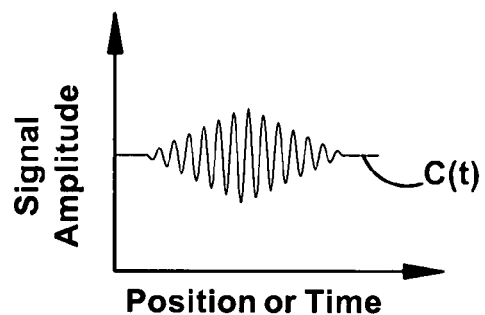
FIG. 6D is a graph of a signal reading from a photodetector array after electronic filtering.

Shown in FIG. 6D is a typical signal reading C(t) from the photodetector array 561 after electronic filtering. The pixels, scanned at a rate that can be 1 kHz, exhibit the cross-correlation function C(t) of the Fabry-Perot gap 526 that is cross-correlated with the Fizeau wedge 551. Software is used to find the pixel where the function C(t) has its maximum value C(t)max. Various options can be implemented in software to precisely determine C(t)max.

Figure 7:
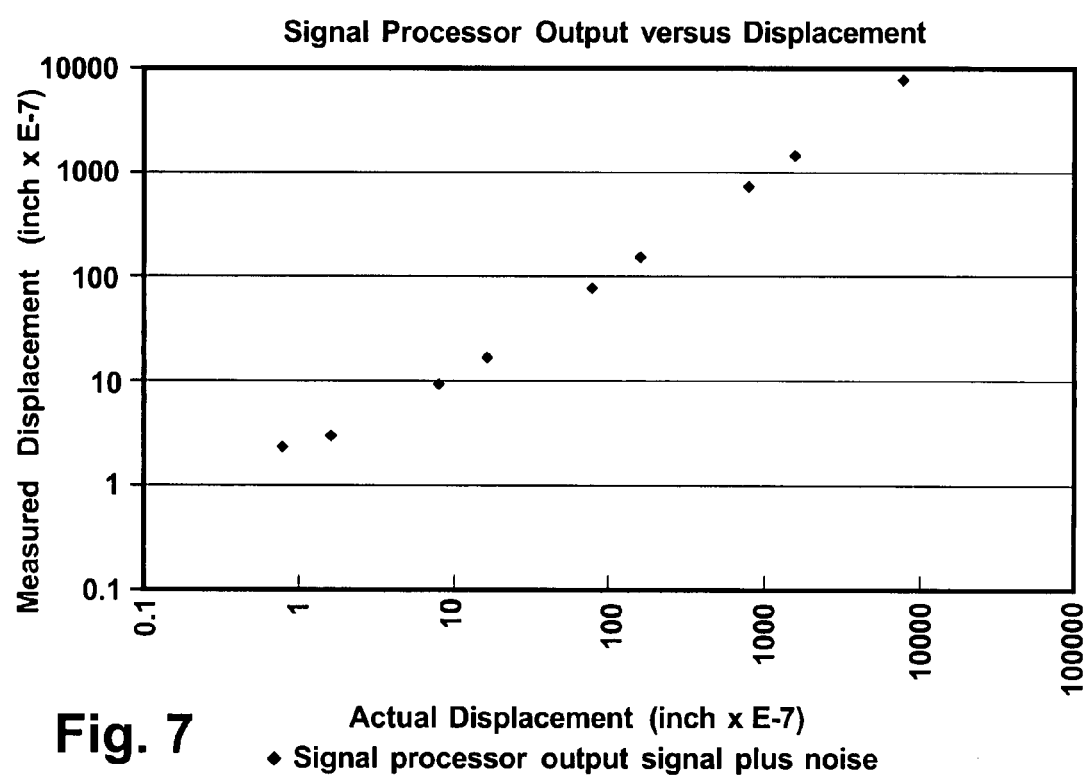
FIG. 7 is a graph plotting signal processor output signal versus displacement for a Fabry-Perot fiber optic displacement sensor according to the present invention.

FIG. 7 is a graph plotting signal processor output signal versus displacement for the sensing system as described herein. This result shows that Fabry-Perot gap 526 and thus diaphragm deflection in the differential pressure transducer can be measured over a range from $8\times10^{-8}$ inch ($2\times10^{-9}$ m) to $8\times10^{-4}$ inch ($20\times10^{-6}$ m). In an embodiment, the maximum predicted deflection is $3.45\times10^{-6}$ m=3.45 μm (see Table 1), which is well within the measurement range. The dynamic range is given by ($3.45\times10^{-6}$ m)/($2\times10^{-9}$ m)=1720. Thus, resolution of differential pressure is: 15 psi/1720=0.0087 psi.

The invention has been described above and, obviously, modifications and alternations will occur to others upon a reading and understanding of this specification. The claims as follows are intended to include all modifications and alterations insofar as they come within the scope of the claims or the equivalent thereof.

We claim:

1. A differential pressure transducer comprising:
   a transducer housing;
   a diaphragm coupled to said transducer housing;
   a first bellows coupled to said transducer housing and said diaphragm forming a first pressure chamber;
   a second bellows coupled to said transducer housing and said diaphragm forming a second pressure chamber that is not in fluid communication with said first pressure chamber; and
   a sensing assembly positioned to measure movement of said diaphragm due to pressure differences between said first and second pressure chambers.

2. The differential pressure transducer of claim 1 wherein said transducer housing includes a bearing surface positioned to limit movement of said diaphragm.

3. The differential pressure transducer of claim 1 wherein said sensing assembly includes at least one Fabry-Perot fiber optic displacement sensor.

4. The differential pressure transducer of claim 3 wherein said diaphragm includes a reflective surface defining an end of a Fabry-Perot gap.

5. The differential pressure transducer of claim 1 wherein said transducer housing is positioned within an orifice plate.

6. The differential pressure transducer of claim 1 wherein said transducer housing is positioned within a venturi tube.

7. A differential pressure transducer comprising:
   a transducer housing including a pressure chamber;
   a diaphragm coupled to said transducer housing wherein a first section of said diaphragm is positioned within said pressure chamber to separate a first portion of said pressure chamber from a second portion of said pressure chamber; where said first portion is not in fluid communication with said second portion;
   a stem coupled to said diaphragm along a second section of said diaphragm;
   a sealing member positioned to seal said first section of diaphragm from said second section of diaphragm; and a sensing assembly positioned to measure movement of said stem resulting from differences in pressure between said first and second portions of said pressure chamber.

8. The differential pressure transducer of claim 7 wherein said transducer housing includes a bearing surface positioned to limit movement of said diaphragm.

9. The differential pressure transducer of claim 7 wherein said sensor assembly includes a Fabry-Perot fiber optic displacement sensor.

10. The differential pressure transducer of claim 9 wherein said stem includes a reflective surface defining an end of Fabry-Perot gap.

11. The differential pressure transducer of claim 7 wherein said transducer housing is positioned within an orifice plate.

12. The differential pressure transducer of claim 7 wherein said transducer housing is positioned within a venturi tube.

13. The differential pressure transducer of claim 7 wherein said sealing member is a bellows.

14. A differential pressure transducer comprising:
 a transducer housing including a pressure chamber having a first portion and a second portion, wherein said first portion is not in fluid communication with said second portion;
 a diaphragm including a first surface and a second surface, wherein said diaphragm is secured to said transducer housing and at least partially positioned within said pressure chamber;
 a bellows secured to said transducer housing and said diaphragm, wherein said bellows, said first surface, and said transducer housing define said first portion and said bellows, said second surface, and said transducer housing define said second portion;
 a stem coupled to said diaphragm; and
 a Fabry-Perot fiber optic displacement sensor assembly positioned to measure movement of said stem.

15. The differential pressure transducer of claim 14 wherein said stem is positioned along a center axis of said diaphragm.

16. The differential pressure transducer of claim 15 wherein said stem includes a reflective surface defining an end of a Fabry-Perot gap.

17. The differential pressure transducer of claim 14 wherein said transducer housing further includes a diaphragm stop to limit movement of said diaphragm.

18. The differential pressure transducer of claim 14 wherein said diaphragm includes a peripheral edge, wherein said diaphragm is coupled to said transducer housing at said peripheral edge.

19. A method for measuring a pressure difference between a first fluid and a second fluid comprising the steps of:
 providing a chamber for containing fluid;
 positioning a diaphragm in said chamber to form a first portion of said chamber and a second portion of said chamber, where said first portion of said chamber is not in fluid communication with said second portion of said chamber;
 positioning a sensing assembly to sense movement of said diaphragm;
 filling said first portion with said first fluid;
 filling said second portion with said second fluid;
 utilizing sensing assembly to measure movement of said diaphragm resulting from the pressure differences between said first and second portions of said chamber; and
 calculating said pressure difference between said first fluid and said second fluid based on movement of said diaphragm.

\* \* \* \* \*